United States Patent
Cheng et al.

(10) Patent No.: US 8,971,343 B2
(45) Date of Patent: Mar. 3, 2015

(54) METHOD OF PROVIDING SHORT MESSAGE SERVICE IN A NETWORK

(71) Applicant: Acer Incorporated, New Taipei (TW)

(72) Inventors: Tsung-Yo Cheng, New Taipei (TW); Shih-Chun Kuo, New Taipei (TW)

(73) Assignee: Acer Incorporated, Xizhi Dist., New Taipei (TW)

( * ) Notice: Subject to any disclaimer, the term of this patent is extended or adjusted under 35 U.S.C. 154(b) by 122 days.

(21) Appl. No.: 13/848,042

(22) Filed: Mar. 20, 2013

(65) Prior Publication Data

US 2014/0198722 A1    Jul. 17, 2014

Related U.S. Application Data

(60) Provisional application No. 61/751,270, filed on Jan. 11, 2013.

(51) Int. Cl.
*H04W 4/14* (2009.01)
*H04W 88/06* (2009.01)

(52) U.S. Cl.
CPC ............... *H04W 4/14* (2013.01); *H04W 88/06* (2013.01)
USPC ....................................... 370/401

(58) Field of Classification Search
None
See application file for complete search history.

(56) References Cited

U.S. PATENT DOCUMENTS

| | | | |
|---|---|---|---|
| 5,719,918 A * | 2/1998 | Serbetciouglu et al. ...... | 380/271 |
| 2007/0254681 A1* | 11/2007 | Horvath et al. ............... | 455/466 |
| 2010/0087215 A1* | 4/2010 | Gu et al. ....................... | 455/466 |
| 2010/0323725 A1* | 12/2010 | Cai et al. ...................... | 455/466 |
| 2011/0165898 A1* | 7/2011 | Drevon et al. ................ | 455/466 |
| 2011/0280383 A1* | 11/2011 | Varga et al. ................ | 379/93.01 |
| 2012/0236709 A1* | 9/2012 | Ramachandran et al. .... | 370/221 |

FOREIGN PATENT DOCUMENTS

CN            101730020 A      6/2010

* cited by examiner

*Primary Examiner* — Kerri Rose
(74) *Attorney, Agent, or Firm* — Winston Hsu; Scott Margo

(57) ABSTRACT

In a network implemented using packet-switching and circuit-switching mythologies, a short message is sent from a first device to a second device in a packet-switched domain or in a circuit-switched domain of the network. If an initial transmission attempt of the short message in the packet-switched domain is rejected due to a network-related cause, the short message is resent from the first device to the second device in the circuit-switched domain. If an initial transmission attempt of the short message in the circuit-switched domain is rejected due to a network-related cause, the short message is resent from the first device to the second device in the packet-switched domain or is directly aborted.

5 Claims, 2 Drawing Sheets

METHOD OF PROVIDING SHORT MESSAGE SERVICE IN A NETWORK

CROSS REFERENCE TO RELATED APPLICATIONS

This application claims the benefit of U.S. provisional application No. 61/751,270 filed on Jan. 11, 2013.

BACKGROUND OF THE INVENTION

1. Field of the Invention

The present invention is related to a method of providing short message service in a network, and more particularly, to a method of providing short message service with high success rate in a network.

2. Description of the Prior Art

The Short Message Service (SMS) is a popular means of communication over mobile networks in which subscribers can send data, predominantly, text messages across the mobile network to other subscribers. It is now possible to send SMS messages over packet-switched (PS) or circuit-switched (CS) domains, which can be second generation (2G), third generation (3G) or fourth generation (4G) radio access technologies (RAT). These short messages may be user-specific messages intended for specific recipient mobile stations or broadcast messages intended for multiple mobile stations.

According to the 3GPP (3rd Generation Partnership Project) specification TS 24.011 which defines the SMS support on mobile radio interface, a transmission attempt of a short message in the PS domain or the CS domain may be rejected in the 3GPP system due to various error causes. Therefore, there is a need for improving the success rate of SMS.

SUMMARY OF THE INVENTION

The present invention provides a method of providing short message service for devices in a network. The method includes sending a short message from a first device to a second device in a packet-switched domain or in a circuit-switched domain of the network, and resending the short message from the first device to the second device in the circuit-switched domain after a first transmission attempt of the short message in the packet-switched domain is rejected due to a first network-related cause.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
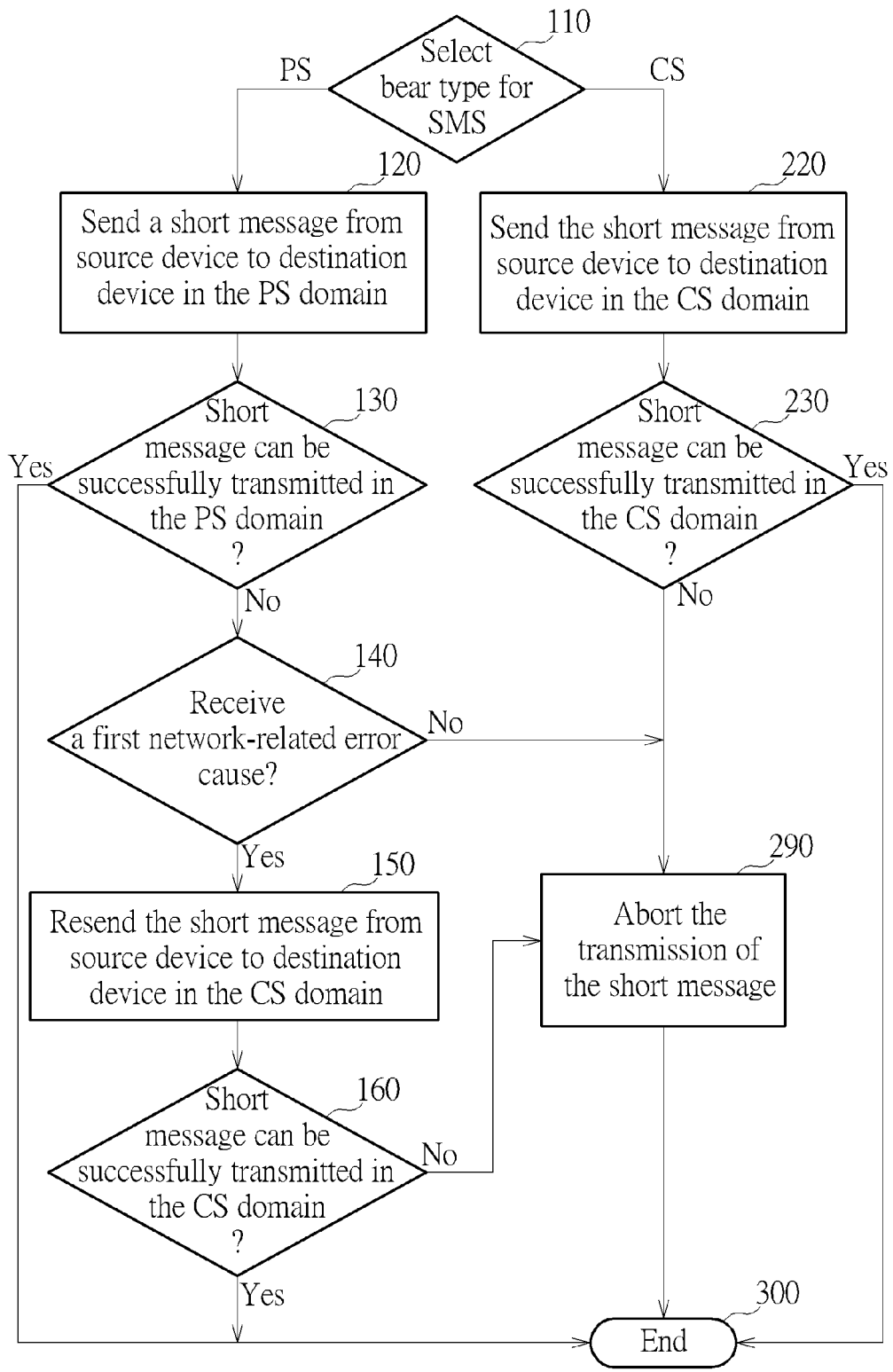
FIGS. 1 and 2 are flowcharts illustrating a method of providing SMS in a network according to embodiments of the present invention.

FIG. 1 is a flowchart illustrating a method of providing SMS in a network according to a first embodiment of the present invention. The network may include a plurality of mobile devices. Data connections may be established in the PS domain or in the CS domain for transmitting a short message from a source device to a destination device. The flowchart in FIG. 1 includes the following steps:

Step 110: select a bear type for SMS; if PS domain is selected, execute step 120; if CS domain is selected, execute step 220.

Step 120: send a short message from the source device to the destination device in the PS domain; execute step 130.

Step 130: determine if the short message can be successfully transmitted in the PS domain; if yes, execute step 300; if no, execute step 140.

Step 140: determine if a first network-related error cause can be received when the transmission attempt of the short message is rejected in the PS domain; if yes, execute step 150; if no, execute step 290.

Step 150: resend the short message from the source device to the destination device in the CS domain; execute step 160.

Step 160: determine if the short message can be successfully transmitted in the CS domain; if yes, execute step 300; if no, execute step 290.

Step 220: send the short message from the source device to the destination device in the CS domain; execute step 230.

Step 230: determine if the short message can be successfully transmitted in the CS domain; if yes, execute step 300; if no, execute step 290.

Step 290: abort the transmission of the short message; execute step 300.

Step 300: end.

The method illustrated in FIG. 1 may be applied to a network which is implemented using both packet-switching and circuit-switching mythologies.

In the CS domain of the network, a physical circuit is first established between a source node and a destination node before any transmission can take place. Once established, the physical circuit is dedicated exclusively to the current transmission and remains connected for the duration of the communication session. When the transmission completes, this circuit is then released and made available for another communication transmission.

In the PS domain of the network, messages are first partitioned into smaller units called packets, which are then sent to the destination nodes via intermediate nodes. Packet-switching sets up a limited number of dedicated connections of constant bit rate and constant delay between nodes for exclusive use during the communication session. Different types of protocols construct different types of packets and they are accordingly read at the receiving end.

In step 110, the transport method to carry the communication between the source device and the destination device is determined. If the PS domain is selected in step 110, the short message is sent from the source device to the destination device in the PS domain in step 120; if the CS domain is selected in step 110, the short message is sent from the source device to the destination device in the CS domain in step 220. The radio access technology and transport method which a device communicates on at any time is dependent on factors including network signal strengths, the type of data communication required by the device, or user preferences etc, and do not limit the scope of the present invention.

In step 130 according to the first embodiment of the present invention, if the short message can be successfully transmitted in the PS domain, step 300 is then executed for ending the SMS; if the short message cannot be successfully transmitted in the PS domain, step 140 is then executed. In step 230 according to the first embodiment of the present invention, if the short message can be successfully transmitted in the CS domain, step 300 is then executed for ending the SMS; if the short message cannot be successfully transmitted in the CS domain, step 290 is then executed for aborting the transmission of the short message.

According to the 3GPP specification TS 24.011, the network is configured to send an RP-ERROR message to the source device when the transmission attempt of the short message in the PS domain is rejected. In step 140, it is determined whether the RP-ERROR message has the first network-related error cause which may include a cause #28 "Unidentified subscriber" or a cause #38 "Network out of order" defined in the 3GPP specification TS 24.011. Cause #28 indicates that the subscriber is not registered in the PLMN (public land mobile network). Cause #38 indicates that the network is not functioning correctly and that the condition is likely to last a relative long period of time. If it is determined in step 140 that the SMS reject is not due to network-related issues, step 290 is then executed for aborting the transmission of the short message; if it is determined in step 140 that the SMS reject is due to network-related issues, step 150 is then executed.

In Step 150, the short message is resent from the source device to the destination device in the CS domain of the network. In step 160, if the short message can be successfully transmitted in the CS domain, step 300 is then executed for ending the SMS; if the short message cannot be successfully transmitted in the CS domain, step 290 is then executed for aborting the transmission of the short message. Therefore, the method according to the first embodiment of the present invention provides an SMS retry mechanism, thereby improving the success rate of SMS.

Figure 2:
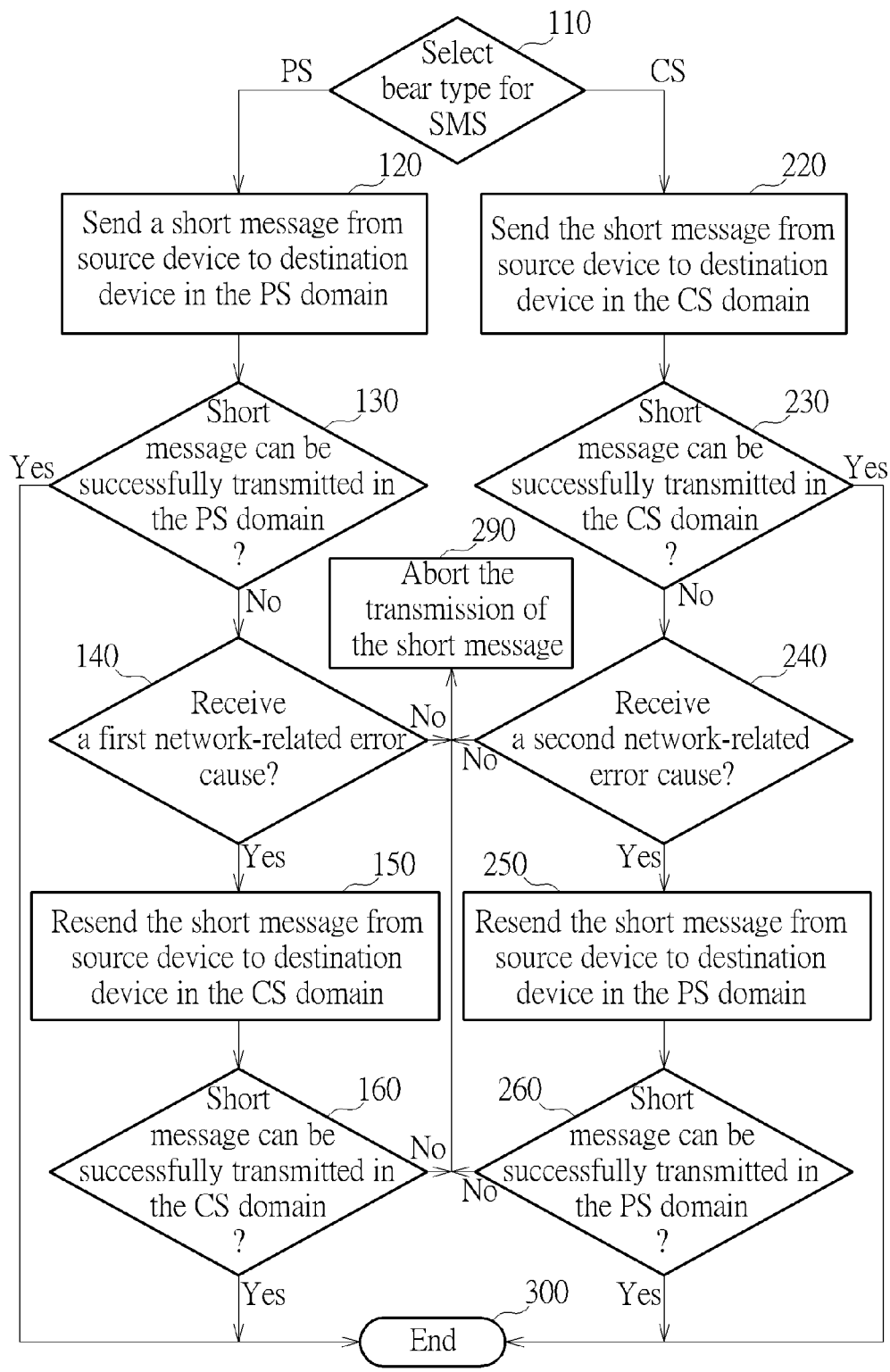

FIG. 2 is a flowchart illustrating a method of providing SMS in a network according to a second embodiment of the present invention. The network may include a plurality of mobile devices. Data connections may be established in the PS domain or in the CS domain for transmitting a short message from a source device to a destination device. The flowchart in FIG. 2 includes the following steps:

Step 110: select a bear type for SMS; if PS domain is selected, execute step 120; if CS domain is selected, execute step 220.

Step 120: send a short message from the source device to the destination device in the PS domain; execute step 130.

Step 130: determine if the short message can be successfully transmitted in the PS domain; if yes, execute step 300; if no, execute step 140.

Step 140: determine if a first network-related error cause can be received when the transmission attempt of the short message is rejected in the PS domain; if yes, execute step 150; if no, execute step 290.

Step 150: resend the short message from the source device to the destination device in the CS domain; execute step 160.

Step 160: determine if the short message can be successfully transmitted in the CS domain; if yes, execute step 300; if no, execute step 290.

Step 220: send the short message from the source device to the destination device in the CS domain; execute step 230.

Step 230: determine if the short message can be successfully transmitted in the CS domain; if yes, execute step 300; if no, execute step 240.

Step 240: determine if a second network-related error cause can be received when the transmission attempt of the short message is rejected in the CS domain; if yes, execute step 250; if no, execute step 290.

Step 250: resend the short message from the source device to the destination device in the PS domain; execute step 260.

Step 260: determine if the short message can be successfully transmitted in the PS domain; if yes, execute step 300; if no, execute step 290.

Step 290: abort the transmission of the short message; execute step 300.

Step 300: end.

Similar to the first embodiment, steps 110-230 are executed in the same manner in the second embodiment of the present invention. However, the flowchart in FIG. 2 further includes steps 240-260.

In step 230 according to the second embodiment of the present invention, if the short message can be successfully transmitted in the CS domain, step 300 is then executed for ending the SMS; if the short message cannot be successfully transmitted in the CS domain, step 240 is then executed.

According to the 3GPP specification TS 24.011, the network is configured to send an RP-ERROR message to the source device when the transmission attempt of the short message in the CS domain is rejected. In step 240, it is determined whether the RP-ERROR message has the second network-related error cause which may include a cause #28 "Unidentified subscriber" or a cause #38 "Network out of order" defined in the 3GPP specification TS 24.011. Cause #28 indicates that the subscriber is not registered in the PLMN (public land mobile network). Cause #38 indicates that the network is not functioning correctly and that the condition is likely to last a relative long period of time. If it is determined in step 240 that the SMS reject is not due to network-related issues, step 290 is then executed for aborting the transmission of the short message; if it is determined in step 240 that the SMS reject is due to network-related issues, step 250 is then executed.

In Step 250, the short message is resent from the source device to the destination device in the PS domain. In step 260, if the short message can be successfully transmitted in the PS domain, step 300 is then executed for ending the SMS; if the short message cannot be successfully transmitted in the PS domain, step 290 is then executed for aborting the transmission of the short message. Therefore, the method according to the second embodiment of the present invention provides an SMS retry mechanism, thereby improving the success rate of SMS.

In the method according to the first embodiment of the present invention as illustrated in FIG. 1, when an initial transmission attempt of a short message is rejected in the PS domain due to network-related issues, the short message is resent in the CS domain; when an initial transmission attempt of the short message is rejected in the CS domain due to network-related issues, the transmission of the short message is directly aborted. Since SMS is generally more stable in the CS domain, the first embodiment of the present invention may improve the success rate of SMS and save retry costs.

In the method according the second embodiment of the present invention, when an initial transmission attempt of a short message is rejected in the PS domain due to network-related issues, the short message is resent in the CS domain; when an initial transmission attempt of a short message is rejected in the CS domain due to network-related issues, the short message is resent in the PS domain. In other words, the transmission of the short message is aborted only when rejected by both the CS and PS domains. The second embodiment of the present invention may be applied in urgent situations, such as Tsunami or earthquake, when all available resources need to be used for sending the short message.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of providing short message service (SMS) for devices in a network, comprising:

sending a short message from a first device to a second device in a packet-switched (PS) domain or in a circuit-switched (CS) domain of the network;

the first device receiving a first error message indicating a failure of a first transmission attempt of the short message in the PS domain;

the first device determining if the first transmission attempt of the short message is rejected in the PS domain due to a first network-related failure; and resending the short message from the first device to the second device in the CS domain after determining that the first transmission attempt of the short message in the PS domain is rejected due to the first network-related failure.

2. The method of claim 1, further comprising:

the first device determining that the first transmission attempt of the short message is rejected in the PS domain due to the first network-related failure when the error message has a cause #28 "Unidentified subscriber" or a cause #38 "Network out of order" defined in a 3GPP specification TS 24.011.

3. The method of claim 1, further comprising:

resending the short message from the first device to the second device in the PS domain after a second transmission attempt of the short message in the CS domain is rejected due to a second network-related failure.

4. The method of claim 3, further comprising:

the first device receiving a second error message indicating a failure of the second transmission attempt; and the first device determining that the second transmission attempt of the short message is rejected in the CS domain due to the second network-related failure when the second error message has a cause #28 "Unidentified subscriber" or a cause #38 "Network out of order" defined in a 3GPP specification TS 24.011.

5. The method of claim 1, further comprising:

aborting transmitting the short message after a second transmission attempt of the short message in the CS domain is rejected.

* * * * *